Oct. 15, 1946.     R. C. SHOEMAKER     2,409,398
TRUCK LOADER
Filed Feb. 16, 1945     6 Sheets-Sheet 1

Inventor:
Robert C. Shoemaker

Oct. 15, 1946. R. C. SHOEMAKER 2,409,398
TRUCK LOADER
Filed Feb. 16, 1945 6 Sheets-Sheet 2

Fig. 2

Inventor:
Robert C. Shoemaker
By McCaleb, Wendt & Dickinson
Attys.

Oct. 15, 1946.  R. C. SHOEMAKER  2,409,398
TRUCK LOADER
Filed Feb. 16, 1945  6 Sheets-Sheet 6

Inventor
Robert C. Shoemaker
By McCaleb, Wendt & Dickinson
Attys.

Patented Oct. 15, 1946

2,409,398

UNITED STATES PATENT OFFICE 2,409,398

TRUCK LOADER

Robert C. Shoemaker, Portland, Oreg., assignor to Hyster Company, Portland, Oreg., a corporation of Oregon Application February 16, 1945, Serial No. 578,256

19 Claims. (Cl. 214—81)

This invention relates to truck loaders, and more particularly to truck loading apparatus adapted to be mounted on the body of a truck and carried thereby for operation at will with motive power furnished by the truck and controlled to a large extent by the truck movements.

The truck loader of the present invention is an improvement, in certain respects, of that shown in my co-pending application Serial No. 468,927, filed December 14, 1942, now Patent No. 2,394,940, granted February 12, 1946.

It is a general object of this invention to provide an improved truck loader of the character described in which the structure is simplified from the standpoint of manufacturing and operation and the operating characteristics and controls are improved.

Another and more specific object of the invention is to provide an improved truck loader in which a single load lifting cable not only carries the load carrying device of the apparatus in vertical and swinging movements, but also co-acts with the other parts of the apparatus to control the timing and sequence of the movements and to transmit the force for swinging movement in one direction.

The invention has for a further object the provision in a truck loader including a lifting structure mounted on the truck body and a lifting cable through which operating force is derived from a drum on one of the truck driving wheels of a construction and arrangement of parts such that the tendency of the lifting forces to twist the truck body is minimized, and increased lifting force tends to reduce the possibility of truck wheel slippage which would result in a loss of lifting effort.

It is another object of the invention to provide a truck loader in which the cable through which lifting force is exerted upon the load handling device co-acts with the load lifting structure to exert a practically uniform load swinging torque through the full circuit of swinging travel during the loading movement of the load handling device.

An additional object of the present invention is to provide loading apparatus including a simple, effective and adjustable boom supporting structure which effects increased resistance to the swinging movement of the boom in one direction as the boom approaches a preselected position of rest.

Another object of the invention is to provide a truck loader adapted automatically to follow a sequence of movements responsive to predetermined movements of the truck, and in which an improved mechanism for controlling a portion of the sequential movements is relatively unaffected by the positions of loader parts and is protected against damage from slight overrunning by the operator.

The invention has for an additional object the provision of an improved lifting structure for a truck loader in which lifting structure the normal lifting position relative to the truck body and the length of the path of swinging movement thereof may be varied.

Still another object of the invention is to provide a truck loader with parts constructed and arranged to facilitate the ease of quickly securing the loader parts in an out-of-the-way or traveling position during short hauling trips of the truck and dumping operations.

Other objects and advantages of the invention will be apparent from the following description and the accompanying drawings in which similar characters of reference indicate similar parts throughout the several views.

Figure 1:
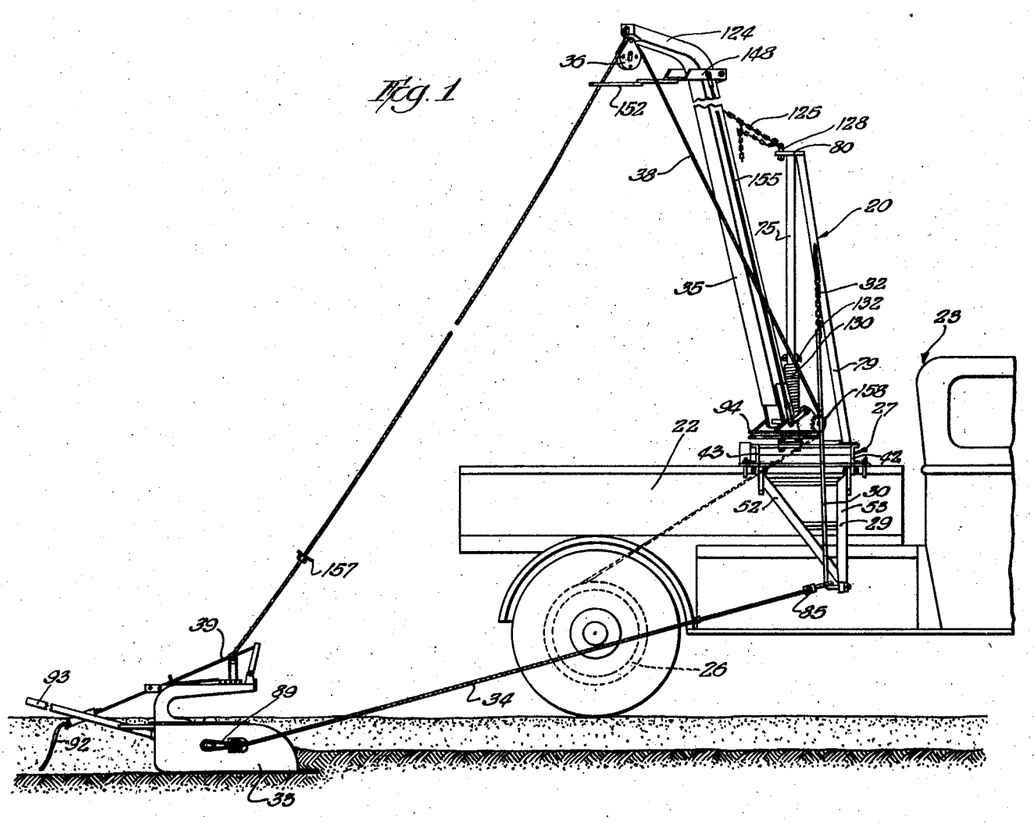
Fig. 1 is a fragmentary and somewhat schematic side elevational view of a conventional type of dump truck having mounted thereon a loader which is illustrative of the features of my invention.
Figure 2:
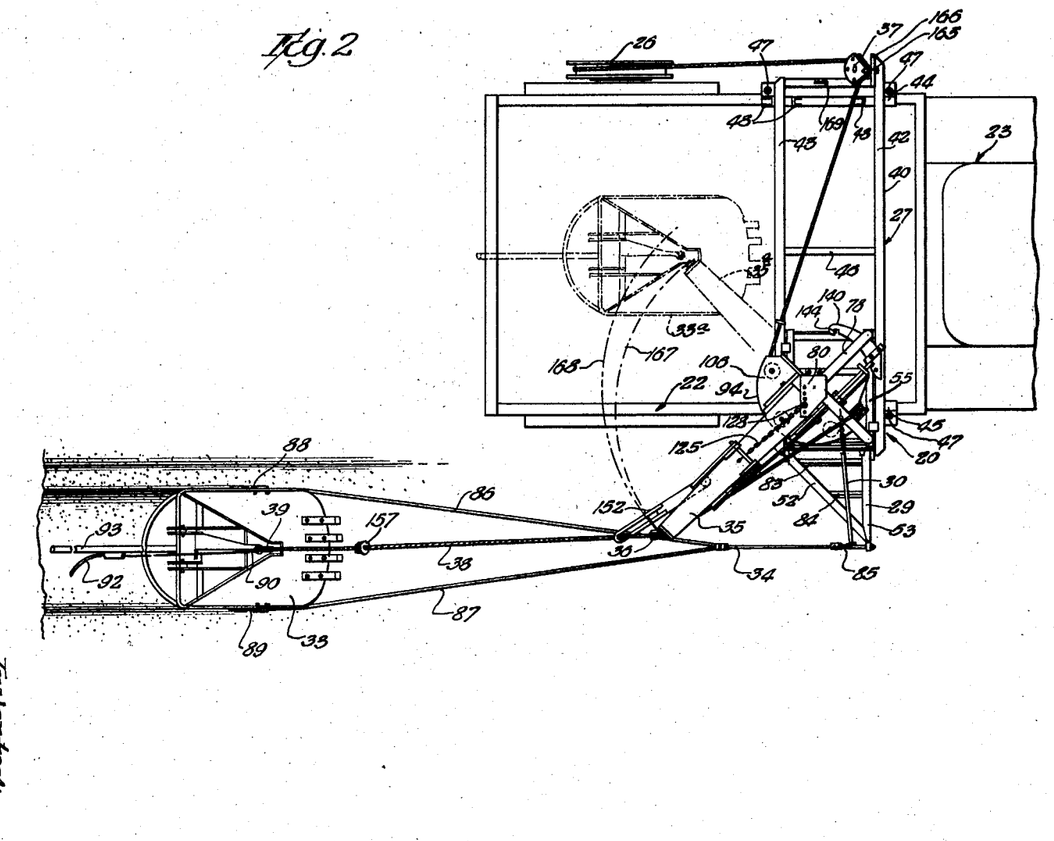
Fig. 2 is a top plan view of the truck and loader shown in Fig. 1.
Figures 3, 4, 5:
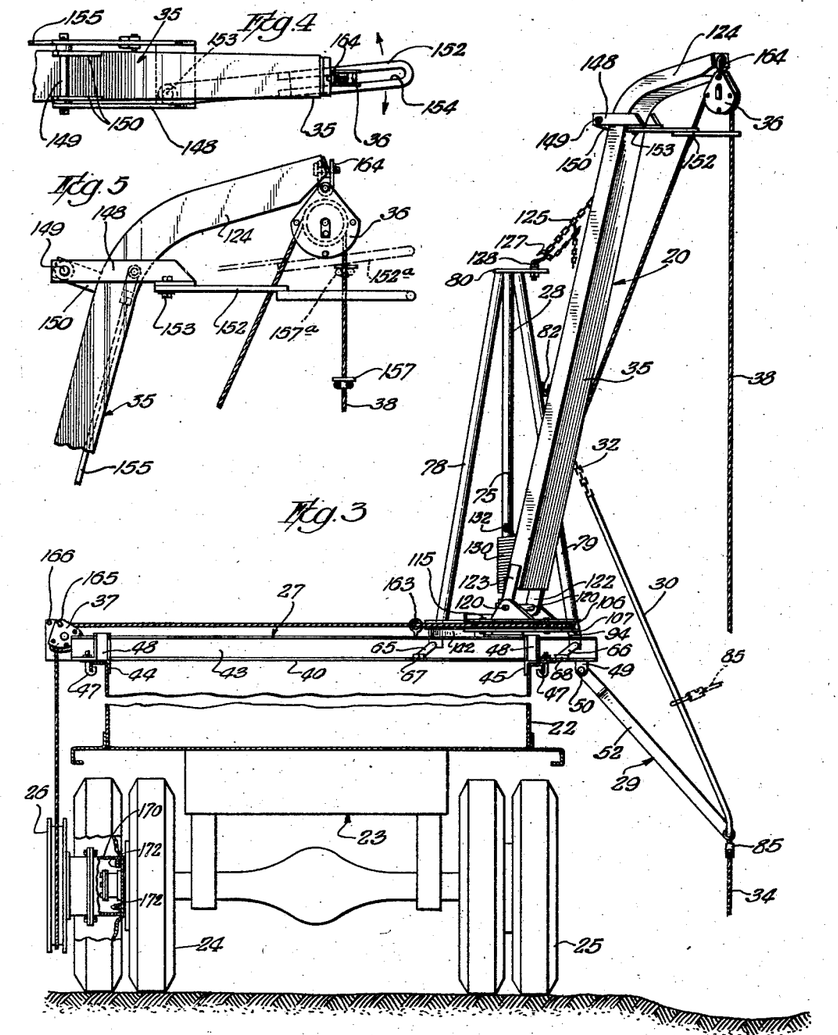
Fig. 3 is a rear elevational view with the front portion of the truck omitted and having parts cut away better to illustrate the installation and adaptation of the preferred form of loader to a conventional truck.
Figs. 4 and 5 are, respectively, top plan and side elevational views to an enlarged scale of a portion of the structure of the loader shown in Figs. 1, 2 and 3.

Although many of the features of my invention are more generally applicable, they are shown and described in this application in an exemplary adaptation to a truck loader constructed for removable installation on dump trucks and the like. As generally shown in Figs. 1, 2 and 3, the loader 20 is mounted on a dump body 22 of a conventional truck 23 in a manner and position such that it is adapted to lift material from ground level at the side of the truck. The truck includes rear wheels 24 and 25. Although the power for operating the loader may be provided in different ways, it is preferred in the present instance and with the disclosed structure and arrangement of parts, to operate the loader by movements of the truck and with power obtained through the use of a winding drum 26 mounted on rear truck wheel 24 on the opposite side of the truck from that upon which the loader is mounted.

Considered generally, the loader includes a supporting base 27 which is preferably secured near the forward end of the dump truck body. Secured to the base and extending upwardly therefrom in a generally vertical direction is a mast 28 which serves as a part of the supporting structure of the loader. As a counter-part of the loader a drag bar 29 is hingedly connected to the end of the base 27 near which the mast 28 is secured and extends laterally outwardly and downwardly from that end of the base to a position determined by a link 30, having one end connected to the extending end of the drag bar and its other end adjustably anchored to the mast 28 through a chain 32. In the operation of the loader for use such as road work a load carrying device, such as a slip scraper bucket 33, is drawn forwardly by forward movement of the truck through a drag line 34 having one end connected to the bucket and its other end connected to the drag bar. Lifting and movement of the loaded bucket 33 to a position over the truck body for dumping are accomplished by a boom 35 having its lower end mounted adjacent the mast 28 for movement about adjacent vertical and horizontal axes and extending upwardly and outwardly to a position beyond the side of the truck body, which desirably is practically above the normal line of operation of the bucket. The boom 35 and base 27 carry blocks or pulleys, such as 36 and 37 respectively, through which a hoisting line 38 extends from a coupling on the bucket to the winding drum 26 to effect lifting and swinging of the bucket during rearward movement of the truck.

Considering the various parts of the loader in greater detail, the supporting base 27 includes an outer frame 40 which extends laterally across the truck body, and is desirably made up of parallel front and rear frame members 42 and 43, which are preferably of channel section, and connected together at their ends by longitudinally extending angle strips 44 and 45, as well as an intermediate bracing strip 46. The outer frame 40 is secured to the truck body by hook bolts 47 extending through the angle strips 44 and 45 which serve as runners engaging the side flanges of the truck body; the hook bolts having their hooked ends gripped around the flanged side edge of the body. When desired, channel sockets 48 are secured to the angle strips 44 and 45 and extend upwardly therefrom to provide supports for removable side extension boards. At one side of the base frame 40 (the right hand side as viewed in Figs. 3, 6, 8 and 9) the frame members 42 and 43 extend beyond the side of the truck body and have downwardly projecting ears 49 secured thereto through which bolts 50 extend to provide the hinge supports for side frame members 52 and 53 of the drag bar 29. Frame 40 is desirably braced between the ends of the frame members 42 and 43 adjacent the ears 49 by an angle strip 54.

As best shown in Figs. 2 and 6 to 9, inclusive, a smaller inner frame 55 is removably secured within the outer frame 40 at one end thereof for the more direct support of the mast and boom structure. This inner frame 55 has parallel frame members 56 and 57 adjacent and spaced somewhat inwardly from outer frame members 42 and 43. The inner frame members 56 and 57 are preferably of channel section and are connected at their ends by frame members 58 and 59, which are likewise preferably of channel section. Small blocks 60 and 62 secured to the top surfaces of the frame members 56 and 57, respectively, in diagonally displaced positions on the inner frame, are adapted to engage the outer frame members 42 and 43 to aid in the placement and support of the inner frame relatively to the outer frame.

The inner frame is removably secured to the outer frame and supported by rods 63 and 64, each extending through aligned openings in the outer frame members 42 and 43 and the inner frame members 56 and 57. Angularly disposed ends 65 and 66 on the rods 63 and 64, respectively, serve as handles for the removal of the rods and also as latch members which are turned downwardly, as shown in Fig. 6, after the installation of the rods, in which position ears 67 and 68 on the outer frame member 43 hold the rods in place and prevent their accidental removal.

Intermediate the ends of the inner frame a pair of oppositely disposed parallel channel members 69 and 70 are secured at their ends to the frame members 56 and 57 and provide a support to which a flanged main support member 72 is secured by bolts 73. As shown in Fig. 7, the flanged support member 72 has an opening 74 therein into which a substantially vertical leg 75 of the mast 28 fits, and wherein that leg is secured by fastening means, such as bolts 76, extending through both the support member 72 and the vertical leg 75, as well as an inner reinforcing block 77.

Figures 8, 9:
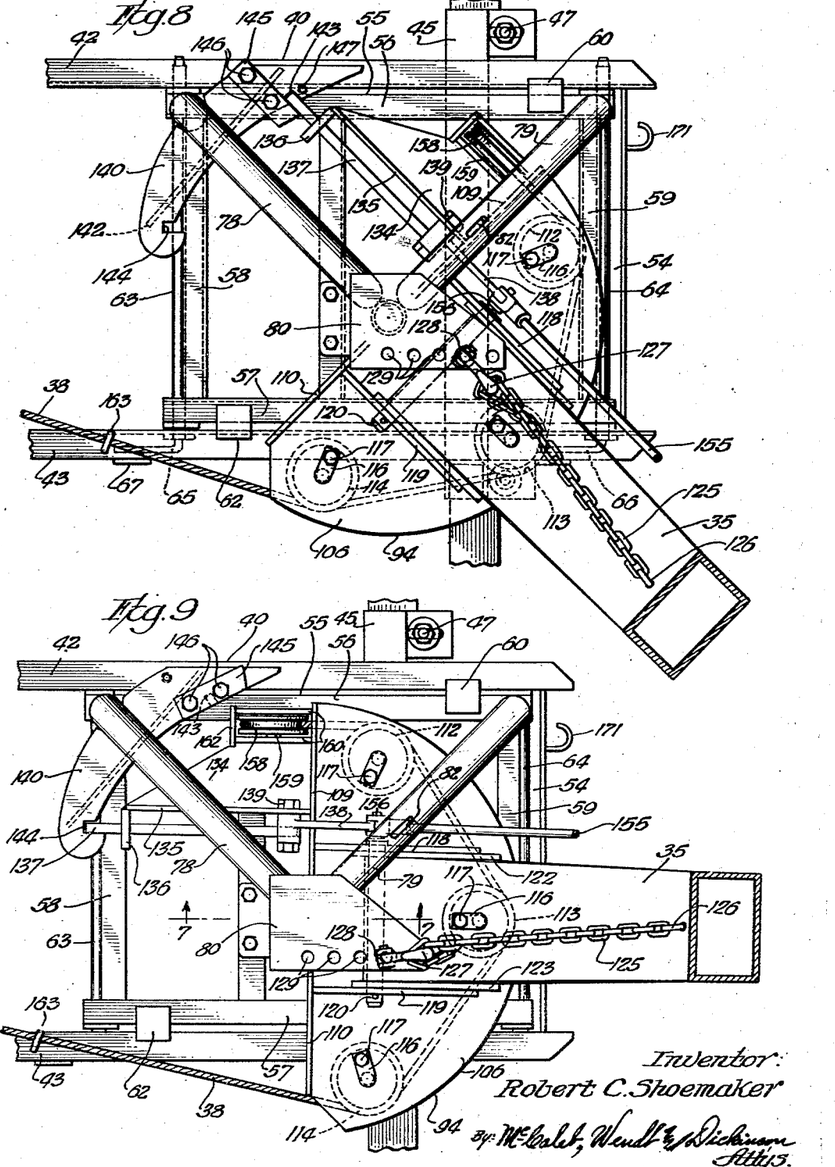
Figs. 8 and 9 are fragmentary top plan views of a portion of the structure shown in Fig. 6 which show the parts of the loader in different operating positions.

In addition to the substantially vertical leg 75, the mast 28 includes bracing legs 78 and 79, the three of which legs form a tripod. The tops of the legs are secured together by being secured to an anchor plate 80, as shown in Figs. 8 and 9. The lower ends of the bracing legs 78 and 79 are secured to corners of the inner frame 55.

Figures 6, 7:
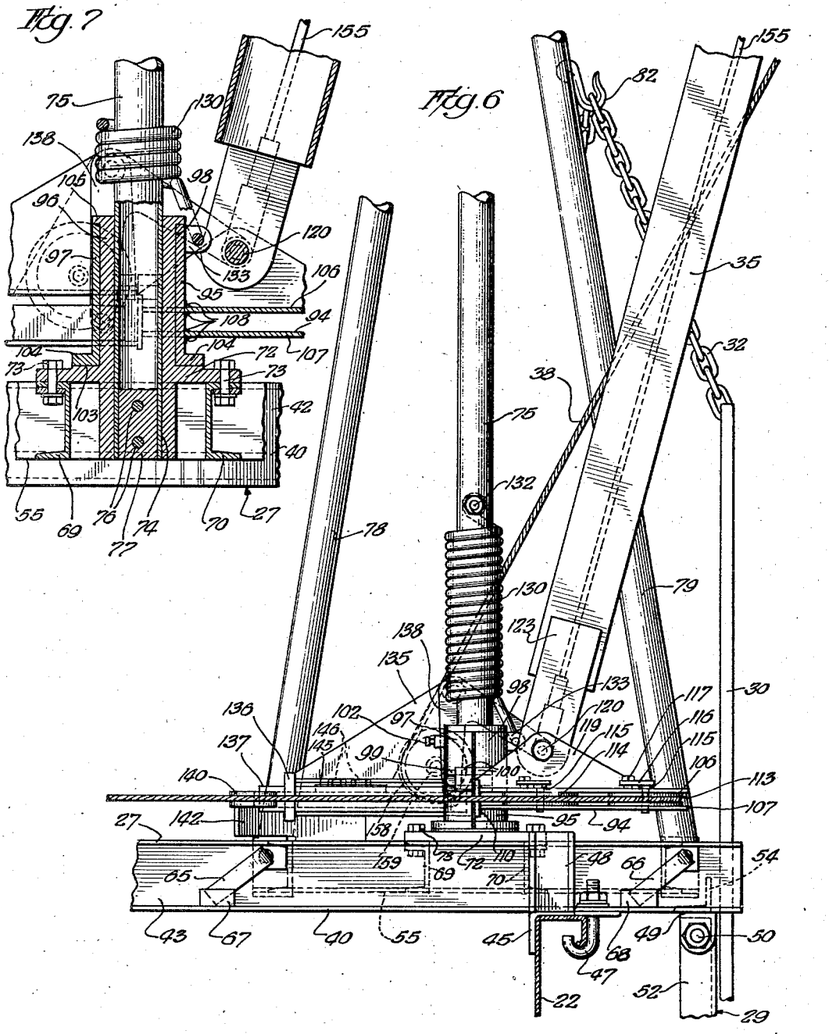
Fig. 6 is a fragmentary side elevational view to an enlarged scale of a portion of the structure shown in Figs. 1, 2 and 3.
Fig. 7 is a fragmentary sectional view of a portion of the structure shown in Fig. 6 with the section taken substantially on the line 7—7 of Fig. 9.

As shown in Figs. 1, 2 and 6, the link 30, which supports the drag bar 29 at a desired angular position, is anchored through the chain 32 to a hook 82 on the bracing leg 79 of the mast. In order that the drag bar 29 shall be substantially rigid with respect to the longitudinal direction of forces applied through the drag line 34 to the slip scraper bucket 33, it is substantially triangular in shape with the side frame members 52 and 53 secured together at their outer ends and extending inwardly to their hinge support in relative angular relation to each other. Braces 83 and 84 extending between the side frame members 52 and 53 add additional rigidity to the drag bar structure. A ring socket 85 provides a connection between the link 30 and the drag line 34;

which drag line desirably is divided into two branches 86 and 87 having their ends anchored at 88 and 89, respectively, on opposite sides of the slip scraper bucket.

The slip scraper bucket 33 is of generally conventional construction, including a trip mechanism 90 to which the hoisting line 38 is connected through the coupling 39 and through which the bucket is lifted to an elevated position. A manually operable handle 92 adjacent a rear guiding handle 93 on the bucket is provided for actuation of the trip mechanism 90 to affect release of the bucket for dumping the contents into the truck.

Referring again to Figs. 6 to 9, the lifting structure of the truck loader, by which the slip scraper bucket or other load carrying device is hoisted at the side of the truck and then swung inwardly over the truck body, includes a bull wheel 94 carried by a bearing collar 95 on an upwardly projecting circular bearing portion 96 of the flanged main support member 72. The bearing collar 95 is split along its longitudinal center to provide bearing halves 97 and 98 secured together by fastening means, such as bolts 99, in suitable bosses 100 on the sides of the bearing halves. A greasing fitting 102 (Fig. 6) is desirably provided on one of the bearing halves for the lubrication of the bearing surfaces. The axial load of the hoisting structure on the bull wheel 94 is carried by an end bearing surface 103 provided by flanged ends 104 on the bearing halves and co-acting bearing surface on the flange of the main support 72. The other end of the bearing collar 95 is retained by a flanged end 105 on the main support member 72.

The bull wheel 94 includes a pair of spaced and substantially semi-circular parallel plates 106 and 107 secured to the bearing half 98 by welding, as at 108, and disposed in planes substantially perpendicular to the axis of the bearing collar 95. Along the flat edges of the semi-circular plates 106 and 107 and extending outwardly from the bearing half 98 are vertical reinforcing plates 109 and 110 which overlap the flat edges and are secured to the plates, as by welding. Intermediate the plates 106 and 107, and with their axes disposed in substantially concentric relation with respect to the axis of the bearing collar 95, is a series of grooved pulleys 112, 113 and 114, each of which is rotatably supported by a headed pin 115 held in place by means such as retainer plate 116 secured to the outer surface of the plate 106 by cap screw 117. A pair of parallel and spaced upright boom support plates 118 and 119 are respectively secured to and extend outwardly from the reinforcing plates 109 and 110, and are also secured to and extend upwardly from the upper surface of the bull wheel plate 106. These boom support plates 118 and 119 have journaled therein a boom support shaft 120 which is substantially parallel to the surface of the bull wheel plate 106 and perpendicular to the axis of the bearing collar 95. The shaft 120 also extends through a pair of plates 122 and 123 secured to the lower end of the boom 35, and fitting between the boom support plates 118 and 119, to carry the lower end of the boom for swinging movement about the axis of the shaft 120.

The boom 35 is preferably rectangular in section and of a hollow box-type construction, having its upper end 124 curved outwardly away from the mast. The boom is held in its upwardly and outwardly extending position relative to the axis of the shaft 120 by a flexible connection, such as that provided by a chain 125, which chain has one end secured to a ring 126 on the boom and its other end adjustably connected to a hook 127 on an adjustable back stay anchor 128. A series of spaced apertures 129 aligned along one side of the anchor plate 80 provide a series of mounting positions for the back stay anchor 128 at the top of the mast. The disposition of the anchor plate 80, and particularly the alignment of the series of back stay anchor mounting apertures 129, are such that movement of the back stay anchor along the series of openings varies the eccentricity of the back stay anchor with respect to the axis of the vertical leg 75 and the bearing collar 95.

In the preferred form of the invention which is disclosed, the back stay anchor mounting apertures 129 are displaced from the axis of the bearing collar 95 in a direction longitudinal of the truck, while the aligned apertures are displaced at various distances from the axis of the bearing collar in a direction transverse to the truck. The result of such displacement of the back stay anchor is to vary the center of the radius of movement of the upper portion of the boom relative to the center of movement of the lower end of the boom. The resulting action is that as the boom swings inwardly beyond a predetermined position and toward the position indicated in dot and dash lines at 35a in Fig. 2, the eccentricity of the center of movement of the upper portion of the boom relative to the center of swinging movement of the boom causes the boom and the load carried thereby to be raised during the progress of movement, with a result that the inward movement is increasingly resisted. This resistance to the inward movement of the boom aids in bringing the load to rest or to a state of slow motion at a convenient position for dumping the load into the truck body. The adjustment of the amount of eccentricity by movement of the back stay anchor 128 along the series of openings makes possible the setting of the resistance to inward movement to an amount suited to the load and disposition of the loader. It is pointed out that in any instance the resistance to inward movement effected by the raising of the boom and load is proportional to the weight of the load.

A coil spring 130 surrounding the lower portion of the vertical leg 75 provides a biasing force resisting inward swinging movement of the boom 35 and urging the boom about the axis of bearing 95 to a position in which it extends outwardly over the side of the truck. One end of the spring 130 is anchored to the vertical leg 75 by fastening means such as a bolt 132; while the other end of the spring is connected to a lug 133 on the side of the bearing half 98.

In the plane of the bull wheel 94 and extending away from the flat edge thereof on one side of the bearing collar 95 is a support plate 134 having one end secured to the vertical reinforcing plate 109. Along the inner edge of the support plate 134 and secured thereto, as well as to the vertical reinforcing plate 109, is a second vertical reinforcing plate 135. This second vertical reinforcing plate 135 carries at its outer end a latch guide block 136, which has a slot therethrough and in which one end of a latch bar 137 is mounted for longitudinal sliding movement. The other end of the latch bar 137 (Figs. 6 and 7) is rotatably connected to and carried by one arm of a bell crank 138. A fixed support upon which the bell crank is mounted for rotational movement is provided by a bolt 139 or other suitable means carried by the second reinforcing plate 135. Rotational movement of the bell crank 138 about the fixed axis of the bolt 139 effects longitudinal movement of the latch bar 137 toward and from a latch plate 140 which is secured to the inner frame 55.

The latch plate 140 (Figs. 6 to 9, inclusive) is reinforced and secured in a position in alignment with the end of the latch bar 137 and spaced from the inner frame 55 by an intermediate plate 142. The inner edge of the latch plate 140 is substantially arcuate in shape and concentric with respect to the axis of the bearing collar 95. Notches 143 and 144 in the latch plate 140 at spaced positions along the arcuate inner surface are adapted to receive the end of the latch bar 137 to hold the bull wheel and boom in predetermined fixed positions about the axis of the bearing collar 95.

As shown in Figs. 8 and 9, the stop bar 145 is removably secured to the upper surface of the latch plate 140 adjacent one edge of the notch 143 by means such as bolts 146. This stop bar in the position shown in Fig. 8 projects inwardly beyond the arcuate edge of the latch plate 140 a distance sufficient that the end of the latch bar 137 cannot pass the end of the stop bar even when the latch bar is retracted by movement of the bell crank 138. This establishes the normal locked position of the bull wheel to that shown in Figs. 2 and 8 wherein the boom extends rearwardly of the truck at an angle which may be, for example, approximately 45°. However, when the loading operations make it desirable, the stop bar 145 may be moved to the position shown in Fig. 9 by loosening the bolts 146 and shifting one of the bolts to an aperture 147 in the latch plate. In this position the stop bar covers the notch 143 and thereby prevents the end of the latch bar from entering that notch. In this instance, the latch bar 137 co-acts with the notch 144 to establish the locked positions of the bull wheel and boom to that shown in Fig. 9 in which position the boom extends outwardly practically at right angles to the side of the truck.

Operation of the latch bar 137 to effect disengagement of the latch bar from one of the notches 143 or 144 may be effected by manual movement of the bell crank 138 or automatically by a latch trip mechanism shown in Figs. 3 to 6, inclusive. The latch trip mechanism includes a trip lever 148 rotatably supported near the extending end of the boom 35 by a pin 149 extending through brackets 150 on one side of the boom. Carried at the free end of the trip lever 148 is a trip lever extension 152 having one end secured to the trip lever for swinging movement in a plane substantially parallel to the axis of the trip lever supporting pin 149 by means such as a bolt 153. The other end of the trip lever has a slot 154 through which the hoisting cable 38 passes. At a distance from the pin 149 the trip lever 148 has rotatably connected thereto one end of a link rod 155 which extends downwardly along the boom to the bell crank 138. The lower end of the link rod 155 is connected to the arm of the bell crank by means such as a pin 156. As shown in Figs. 6, 8 and 9, it is particularly desirable that the axis of the pin 156 is in substantial alignment with the axis of the boom supporting pin 120 so that the swinging movement of the boom about the axis of the pin 120 does not effect operation of the latch bar 137 by movement of the bell crank or even vary the position at which the trip lever will effect release of the latch bar 137 from one of the notches of the latch plate. Movement of the trip lever 148 about the axis of the pin 149 in an upward direction swings the bell crank 138 to withdraw the latch.

Since the hoisting line 38 passes through the slot 154 in the extending end of the trip lever extension, automatic operation of the trip lever and the resulting release of the latch bar are effected at a predetermined raised position of the load by a cable clamp 157 which is secured to the hoisting line at a predetermined adjustable position. In order to avoid damage to the latch trip mechanism, which might be caused by overrunning the latch releasing position of the trip lever 148, the block 36 provides a stop which will be engaged by the latch trip lever extension, as indicated in dot and dash lines 152a in Fig. 5, when carried to such position by movement of the cable clamp 157 to the position indicated at 157a. During the operation of the loader, the hoisting line 38 is free to move to various positions without disturbing the operation of the latch trip mechanism, since the hoisting line may move in the slot 154 and the trip lever extension may swing in a horizontal plane about the axis of the bolt 153 to follow the hoisting line.

A direction changing pulley 158 for the hoisting cable 38, as shown in Figs. 8 and 9, is rotatably supported on a shaft 159 carried by a pair of spaced parallel plates 160 near one end of the bull wheel and adjacent the outer edge of the support plate 134. The parallel plates 160 are suitably supported at their opposite ends for swinging movement transversely of the plane of the pulley by and between the vertical reinforcing plate 109 and a vertical support plate 162 which is desirably removably secured to and carried by the support plate 134. The pulley 158 is in a position at the edge of the bull wheel such that the hoisting cable 38 extends directly thereto from the pulley 36 at the end of the boom, and thence around the pulley 158 to the pulleys 112, 113 and 114 of the bull wheel. The hoisting cable 38 extends from the bull wheel pulleys through an eyelet 163 on the outer frame 40 across the truck body and over the pulley 37 to the winding drum 26. The block 36 is desirably mounted for swinging movement by a ring connection 164 at the end of the boom so that it is free to follow the movements of the end of the hoisting line 38; while the block 37 is movably carried by a supporting ring 165 on an extension plate 166 at the end of the support frame 40.

The force necessary to lift the load is thus transmitted through the hoisting line 38 around the pulleys 112, 113 and 114 on the bull wheel which are equi-distantly spaced from the axis of the bearing collar 95 about which the bull wheel and boom are adapted to swing. This force transmitted through the hoisting line around the bull wheel pulleys exerts a force upon and through the bull wheel which is dependent upon the lifted load and the disposition of the boom and which tends to turn the bull wheel in a direction to swing the boom inwardly to a position over the truck body. In other words, the force transmitted through the portion of the hoisting line on the outside of the bull wheel nearer the pulley 26 exerts a component of force tending to rotate the bull wheel in one direction.

In normal operation, the latch mechanism holds the boom in one of the predetermined fixed positions in which it extends outwardly over the side of the truck. While held in one of these fixed positions force applied through the hoisting line moves that hoisting line over the series of pulleys to raise the load to a desired level. In the present instance, the desired level is such that the slip scraper bucket may be freely swung inwardly over the side of the truck. Upon reaching such a level the cable clamp 157 engages the latch trip extension 152 to effect release of the latch bar 137 from its co-acting notch in the latch plate 140, whereupon the boom and load are swung inwardly by the component of the load carrying force which is exerted upon the one side of the bull wheel.

Since the hoisting line 38 extends in practically a semi-circle around the bull wheel 94, and because the bull wheel moves with the boom, the components of force tending to rotate the bull wheel and swing the boom inwardly remain practically constant throughout the entire range of the swinging movement of the boom. The torque applied through the bull wheel which produces the inward swinging movement of the boom is increasingly resisted, as previously explained, by the opposed biasing force of the spring 130 and the raising of the load resulting from the adjusted position of the back stay anchor 128. The upper end of the boom swings in a non-arcuate path, as indicated by the dot and dash line 167 (Fig. 2), as distinguished from an arcuate path indicated by the dot and dash line 168 which would be followed if the back stay anchor 128 were co-axial with the axis of the bearing 95. Adjustments effecting an appropriate balance of the opposed forces at a desired position of the load over the truck materially aid in the rapid operation of the loader and the dumping of the load at a desired position in the truck.

When the truck is to be used for hauling the load to a place for dumping, and during any movements of the truck in which it is unnecessary to dismount the loader, the drag line 34 is disconnected from the drag bar and the hoisting line is disconnected from the slip scraper bucket. The other end of the hoisting line remains connected to the drum 26, but the driving connection to the drum is released. The free end of the hoisting line is then pulled to the side of the truck opposite that upon which the boom is mounted. While the latch bar 137 is manually released from the latch plate 140, sufficient force is manually applied to the free end of the hoisting cable to draw the boom inwardly over the truck body against the biasing force of the spring 130. One end of the hoisting line being anchored to the winding drum, the other end is secured to a member 169 at the end of the outer frame 40 so that the boom will be held in the position inwardly of the truck body. During such operations, the drag bar 29 is dropped to the side of the truck by releasing the chain 32 and anchoring link 30 under hook 171.

In the preferred embodiment of the invention, illustrated in the drawings, the load hoisting force is preferably acquired by attachment of the winding drum 26 to the wheel 24 of the truck and controlling the operation of the drum through control of its driving connection to the wheel and appropriate movements of the truck. The structure of one form of winding drum and its accompanying operating parts are illustrated in Figs. 3 and 10 to 13, inclusive.

Figures 10, 12, 13:
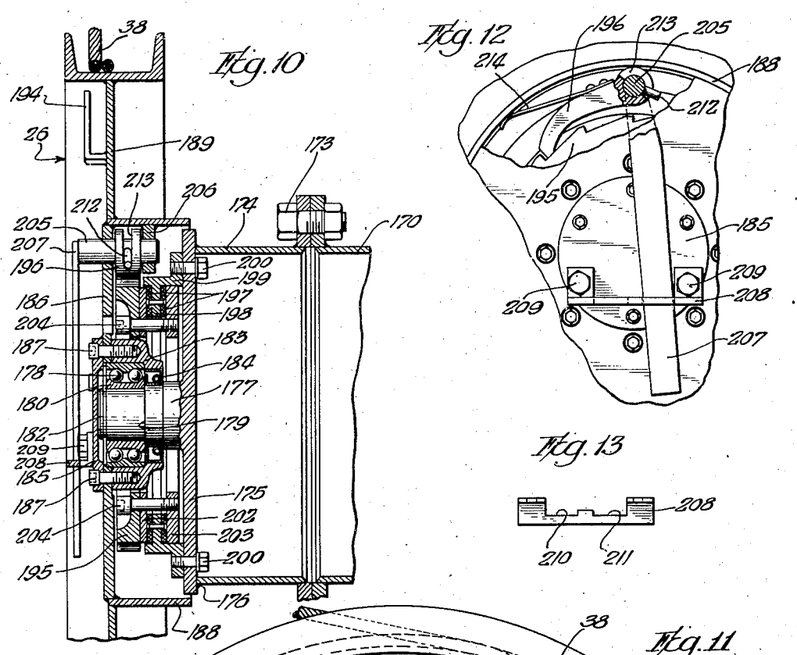
Figs. 10 and 11 are, respectively, fragmentary sectional and end elevational views of a winding drum structure adapted to use with the loader wherein the section of Fig. 10 is taken substantially on a line 10—10 of Fig. 11, and certain parts have been cut away to show the structure in Fig. 11.
Fig. 12 is a fragmentary view of a portion of the structure shown in Fig. 11.
Fig. 13 is a top plan view of one part of the structure shown in Figs. 10 and 11.

As shown in Figs. 3 and 10, the winding drum 26 is supported in proper spaced relation to the wheel 24 by an adapter flange 170, having one end secured to the wheel by hub bolts 172, and having secured to its other end, by means such as bolts 173, an extension flange 174. The extension flange 174 is closed at its outer end by a plate 175 secured thereto as by welding at 176. Extending from the plate 175, and axially with respect to the wheel 24, is a spindle 177 which serves as a support for the winding drum and a portion of the drum driving mechanism.

A bearing 178 has its inner race mounted on the projecting spindle 177 and is held in place on the spindle between a shoulder 179 and a snap ring 180 which fits in a peripheral groove 182 in the outer end of the spindle. An annular bearing housing 183 is carried by the outer race of the bearing 178 and has at its inner end an oil seal 184; while the outer end of the bearing housing is closed by a cap 185 and carries an annular support plate 186, both of which are secured thereto by cap screws 187. On its periphery the annular support plate 186 carries a closure drum 188 of slightly larger diameter than that of the plate 175, which drum extends inwardly over the edge of the plate 175 to form an outer closure for the driving mechanism. The winding drum 36 is carried in radially spaced relation to the closure drum 188 by an annular web 189, which web has secured to the outer plane surface thereof, by a cap screw 190, a suitable cable clamp 192 for holding the end of the hoisting line 38. The cable clamp 192 is desirably adjacent an opening 193 in the face of the drum 26, through which the hoisting cable 38 extends. Also, suitable brackets, such as 194, are preferably secured to the outer plane surface of the web 189 to support the extending loose end of the hoisting cable.

From the portion of the structure of the drum driving mechanism which has been thus far described, it may be understood that the adapter flange 170, extension flange 174, plate 175 and spindle 177 are positively driven by the wheel 24. However, the winding drum, being supported from the bearing 178 through the annular support plate 186 and the web 189, is separately and independently rotatable with respect to the spindle.

To accomplish the driving of the winding drum, for the method of operation preferred in this instance, a ratchet mechanism, including a ratchet ring 195 and pawl 196, provides a driving connection between the plate 175, connected to the wheel, and the support plate 186, connected to the winding drum, during rotation of the wheel in one direction. In this instance, the direction of rotation of the wheel for driving the winding drum is that which produces rearward motion of the truck. By preference, the ratchet ring 195 is secured to the plate 175 for driving purposes through a frictional safety release clutch which, in an emergency, will permit the ratchet ring to slip relative to the plate 175. This friction clutch includes rings of friction material 197 secured to opposite surfaces of an inwardly projecting flange 198 on a flanged ring 199, which flanged ring is secured in concentric relation to the outer surface of the plate 175 by cap screws 200. The opposite faces of the friction rings 197 are adjustably clamped between rings 202 and 203 which are drawn together against the frictional surfaces and secured to the inner surface of the ratchet ring 195 by cap screws 204.

A shaft 205 is rotatably supported near the outer edge of the annular support plate 186 by that plate and a lug 206 projecting radially inwardly from the inner surface of the closure drum 188. At its outer end the shaft 205 has secured thereto a pawl control handle 207, which handle is manually movable to either of two operating positions and latchable in those positions by a sector 208 secured to the outer surface of the cap 185 by means such as cap screws 209. Notches 210 and 211 in the sector 208 hold the handle 207 in the position to which it is manually set; the resilience of the handle permitting its movement from one notch to the other and holding the handle in place in either of the notches.

Figure 11:
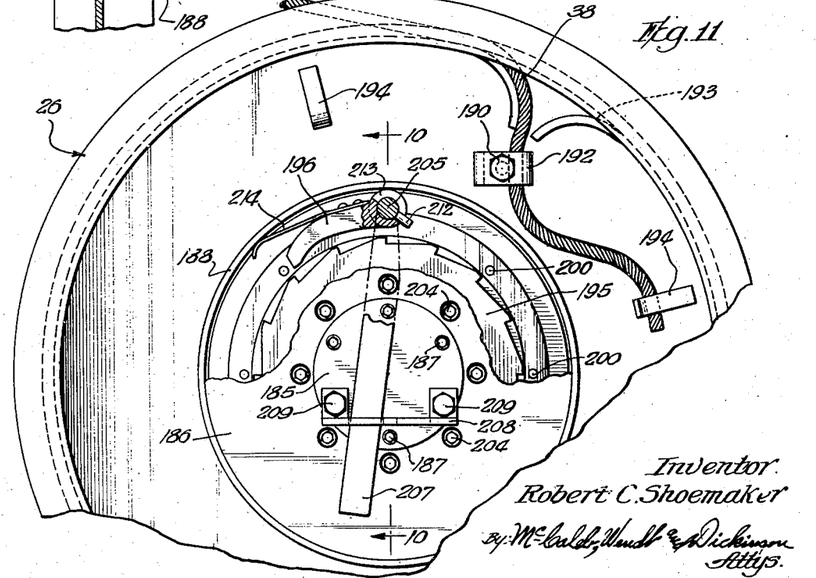

The pawl 196 is rotatably carried by the shaft 205 between the annular plate 186 and the lug 206 in alignment for engagement with the teeth of the ratchet ring 195. A pin 212 carried by the shaft 205 projects radially outwardly therefrom through a substantially semi-circular slot 213 in the pawl 196. The position of one end of the slot 213 relative to the pin 212 is such that when the handle 207 is disposed in the notch 210 of the sector 208, the pawl is held away from the ratchet ring 195, as shown in Fig. 11. In this position of the handle 207 the winding drum 26 is freely movable with respect to the wheel 24. The length of the slot 213 and the movement of the handle 207 from the notch 210 to the notch 211 are sufficient that when the handle is disposed in the notch 211, the pawl is movable to clear the teeth of the ratchet ring 195 and is biased into engagement with these teeth by a leaf spring 214, having one end secured to the pawl and its other end projecting outwardly into engagement with the closure drum 188. In the latter position of the operating handle 207, the winding drum is driven through the ratchet ring and pawl upon movement of the truck wheel in one direction (during rearward movement of the truck), although the winding drum will not be driven during rotation of the wheel in the opposite direction (during forward movement of the truck).

From the foregoing description of the exemplary winding drum driving mechanism, it may be understood that placement of the handle 207 in one operating position effects disengagement of the pawl 196 from the teeth of the ratchet ring 195, so that the driving mechanism is ineffective for driving the winding drum during rotation of the wheel 24 in either direction. However, with the handle 207 in the other of its operating positions, the pawl 196 is biased into engagement with the teeth of the ratchet ring 195 to provide a driving connection between the winding drum and the wheel 24 which is effective during the rearward movement of the truck. With the hoisting line 38 anchored to the web 189 of the winding drum, as shown in Fig. 11, the winding of the hoisting line upon the periphery of the winding drum during the rearward movement of the truck furnishes the force for lifting the load to a position above the side of the truck and then swinging the load inwardly over the body of the truck for dumping, as described. Rearward movement of the truck for effecting the winding operation of the drum is preferred, since by the selection of a proper size for the winding drum, the truck will move rearwardly to a position in which the boom is over the load when the load is raised and after which continued rearward movement lifts the load to the desired level for swinging movement of the load over the side of the truck. The subsequent forward movement of the truck will again lower the slip scraper bucket or other load carrying device to practically the position from which it was raised and from which position it is to be reloaded.

It is to be noted that in the disclosure of the preferred embodiment of my invention the winding drum 26 is mounted on the rear wheel 24 of the truck on the opposite side of the truck from the boom 35. This relative disposition of the boom and winding drum tends to equalize the stresses on the body of the truck during the lifting operation and thereby limits the tendency toward twisting of the body which would result from having the stresses carried entirely at one side of the body; that is, with the disclosed arrangement of parts, the load lifting tension in the hoisting line is downward on the drum side of the truck body and is also downward on the boom side of the truck body.

It is likewise notable that with this arrangement of parts wherein the boom extends over the side of the truck and the winding drum is on the opposite side of the truck, any tendency of the truck to tip, due to excessive load, will not result in the loss of the lifting force by virtue of a loss of traction on one set of wheels caused by the action of the truck differential; that is, lifting of a load increases the normal force and tractive effort of the wheel 25 on the boom side of the truck and thereby reduces the tendency for that wheel to slip. Tendency toward slippage of the wheel 24 is reduced by the load applied through the winding drum, and even though slippage occurred at the wheel 24, the load would be lifted.

In the operation of the disclosed truck loader, the lifting of the load, the swinging of the boom to a dumping position over the truck and the control of the swinging movement are all accomplished with the use of only a single hoisting line and without additional control or swinging lines to complicate the structure or its operation. The construction and arrangement of loader parts is such that the single hoisting line extends across the truck, so as to tend to equalize the forces on the two sides of the truck body. While the boom is locked in a fixed position, the single hoisting line lifts the load as the one end thereof is wound around the winding drum in response to movement of the truck. When the load is raised to a predetermined level higher than the side of the truck, the cable clamp carried by the hoisting line effects release of the boom holding latch so that the forces applied through the hoisting line to the bull wheel exert a practically uniform force throughout the range of swinging movement to swing the boom and load inwardly to a position over the truck body for dumping. In order to stop the boom at a desired position over the truck body for dumping, the practically uniform force which swings the boom inwardly is resisted by the force of the spring 130 and the force necessary to raise the load as a result of the eccentric position of the back stay anchor 128, both of which forces increase as the load swings inwardly. After the dumping of the load into the truck, the relief of tension of the hoisting line and forward movement of the truck permit the boom to swing outwardly under the influence of the spring 130 and the gravitational force resulting from the position of the back stay anchor. The boom is automatically latched again in its normal lifting position, and continued forward movement of the truck lowers the bucket to its position for receiving another load.

While I have illustrated a preferred embodiment of my invention, many modifications may be made without departing from the spirit of the invention, and I do not wish to be limited to the precise details of construction set forth, but desire to avail myself of all changes within the scope of the appended claims.

I claim:

1. Truck loading apparatus adapted to be secured to the body of a truck and comprising, in combination, a supporting structure adapted to be mounted upon the truck body and including a boom extending upwardly and outwardly at one side of the truck body, said boom being supported for swinging movement from a normal position in which it extends laterally beyond the side of the truck to a position in which it overhangs the truck body with the top of the boom substantially spaced thereabove, a drag bar extending laterally from the boom side of the truck and supported by the support structure, a scoop device, a drag line having one end secured to the outer end of the drag bar and extending rearwardly of the truck with its other end connected to the scoop device, a series of pulleys carried by the boom and supporting structure, a winding drum carried by a rear wheel of the truck on the opposite side of the truck from the boom, a hoisting cable secured at one end to the scoop device and extending upwardly therefrom to a pulley on the boom and thence downwardly and across the truck body through other of said pulleys to the winding drum, the other end of said hoisting cable being secured to the winding drum, and means adapted to drive said drum from the wheel when the truck moves in one direction to wind the hoisting cable on the drum for raising the scoop device, the last mentioned means being adapted to release the drum during movement of the truck in the opposite direction so that the scoop device may be dragged by the drag line and drag bar.

2. Truck loading apparatus adapted to be secured to the body of a truck and comprising, in combination, a supporting structure adapted to be mounted upon the truck body and including a boom extending upwardly and outwardly at one side of the truck body, means including a bull wheel supporting the boom for swinging movement from a normal position in which it extends laterally beyond the side of the truck to a position in which it overhangs the truck body with the top of the boom substantially spaced thereabove, a drag bar extending laterally from the boom side of the truck and supported by the support structure, a scoop device, a drag line having one end secured to the outer end of the drag bar and extending rearwardly of the truck with its other end connected to the scoop device, a series of pulleys carried by the boom, bull wheel and supporting structure, a winding drum carried by a rear wheel of the truck on the opposite side of the truck from the boom, a hoisting cable secured at one end to the scoop device and extending upwardly therefrom to a pulley on the boom and thence downwardly to the pulleys on said bull wheel and across the truck body through other of said pulleys to the winding drum, the other end of said hoisting cable being secured to the winding drum, and means adapted to drive said drum from the wheel when the truck moves in one direction to wind the hoisting cable on the drum for raising the scoop device, the tension in the hoisting cable during lifting and applied to the pulleys on the bull wheel providing the turning force for swinging the boom inwardly, the last mentioned means being adapted to release the drum during movement of the truck in the opposite direction so that the scoop device may be dragged by the drag line and drag bar.

3. Truck loading apparatus adapted to be secured to the body of a truck and comprising, in combination, a supporting structure adapted to be mounted upon the truck body and including a boom extending upwardly and outwardly at one side of the truck body, means including a bull wheel supporting the boom for swinging movement from a normal position in which it extends laterally beyond the side of the truck to a position in which it overhangs the truck body with the top of the boom substantially spaced thereabove, a drag bar extending laterally from the boom side of the truck and supported by the support structure, a scoop device, a drag line having one end secured to the outer end of the drag bar and extending rearwardly of the truck with its other end connected to the scoop device, a series of pulleys carried by the boom, bull wheel and supporting structure, a winding drum carried by a rear wheel of the truck, a hoisting cable secured at one end to the scoop device and extending upwardly therefrom to a pulley on the boom and thence downwardly to the pulleys on said bull wheel and through other of said pulleys to the winding drum, the other end of said hoisting cable being secured to the winding drum, and means adapted to drive said drum from the wheel when the truck moves in one direction to wind the hoisting cable on the drum for raising the scoop device, the tension in the hoisting cable during lifting and applied to the pulleys on the bull wheel providing the turning force for swinging the boom inwardly, the last mentioned means being adapted to release the drum during movement of the truck in the opposite direction so that the scoop device may be dragged by the drag line and drag bar.

4. Truck loading apparatus adapted to be secured to the body of a truck and comprising, in combination, a supporting structure adapted to be mounted upon the truck body and including a boom extending upwardly and outwardly at one side of the truck body, means including a bull wheel supporting the boom for swinging movement from a normal position in which it extends laterally beyond the side of the truck to a position in which it overhangs the truck body with the top of the boom substantially spaced thereabove, spring means biasing the boom toward said normal position, a drag bar extending laterally from the boom side of the truck and supported by the support structure, a scoop device, a drag line having one end secured to the outer end of the drag bar and extending rearwardly of the truck with its other end connected to the scoop device, a series of pulleys carried by the boom, bull wheel and supporting structure, a winding drum carried by a rear wheel of the truck, a hoisting cable secured at one end to the scoop device and extending upwardly therefrom to a pulley on the boom and thence downwardly to the pulleys on said bull wheel and through other of said pulleys to the winding drum, the other end of said hoisting cable being secured to the winding drum, and means adapted to drive said drum from the wheel when the truck moves in one direction to wind the hoisting cable on the drum for raising the scoop device, the tension in the hoisting cable during lifting and applied to the pulleys on the bull wheel providing the turning force for swinging the boom inwardly, the last mentioned means being adapted to release the drum during movement of the truck in the opposite direction so that the scoop device may be dragged by the drag line and drag bar.

5. Truck loading apparatus adapted to be secured to the body of a truck and comprising, in combination, a supporting structure adapted to be mounted upon the truck body and including a boom extending upwardly and outwardly at one side of the truck body, means including a bull wheel supporting the boom for swinging movement from a normal position in which it extends laterally beyond the side of the truck to a position in which it overhangs the truck body with the top of the boom substantially spaced thereabove, a latch releasably holding the boom in said normal position, a drag bar extending laterally from the boom side of the truck and supported by the support structure, a scoop device, a drag line having one end secured to the outer end of the drag bar and extending rearwardly of the truck with its other end connected to the scoop device, a series of pulleys carried by the boom, bull wheel and supporting structure, a winding drum carried by a rear wheel of the truck, a hoisting cable secured at one end to the scoop device and extending upwardly therefrom to a pulley on the boom and thence downwardly to the pulleys on said bull wheel and through other of said pulleys to the winding drum, the other end of said hoisting cable being secured to the winding drum, latch actuating means carried by the hoisting cable for releasing said latch means at a predetermined position of the hoisting cable during lifting, and means adapted to drive said drum from the wheel when the truck moves in one direction to wind the hoisting cable on the drum for raising the scoop device, the tension in the hoisting cable during lifting and applied to the pulleys on the bull wheel providing the turning force for swinging the boom inwardly, the last mentioned means being adapted to release the drum during movement of the truck in the opposite direction so that the scoop device may be dragged by the drag line and drag bar.

6. In loading apparatus the combination of a bull wheel supported for rotation about a vertical axis, an upwardly projecting boom supported at the lower end on the bull wheel and mounted for swinging movement about a horizontal axis at said lower end, a series of pulleys rotatably secured to the bull wheel in a common plane and substantially equi-distant from said vertical axis, means anchored at one end for supporting the upper end of said boom for swinging movement about said vertical axis, means biasing the boom to a normal position, said one end of the anchored means being eccentric to said vertical axis so that movement of the boom in one direction from the normal position about the vertical axis raises the upper end of the boom and thereby provides increasing resistance to movement in said one direction as such movement progresses, a pulley at the upper end of said boom, and a hoisting cable extending through the last mentioned pulley and around the pulleys on the bull wheel so that tension for lifting applied through the hoisting cable exerts a force through the bull wheel for swinging the boom about the vertical axis in said one direction.

7. In a loading apparatus the combination of a bull wheel supported for rotation about a vertical axis, an upwardly projecting boom supported at the lower end on the bull wheel and mounted for swinging movement about a horizontal axis at said lower end, means anchored at one end for supporting the upper end of said boom for swinging movement about said vertical axis, means biasing the boom to a normal position, said one end of the anchored means being eccentric to said vertical axis so that movement of the boom in one direction from the normal position about the vertical axis raises the upper end of the boom and thereby provides increasing resistance to movement in said one direction as such movement progresses, a pulley at the upper end of said boom, and a hoisting cable extending through the last mentioned pulley and co-acting with the bull wheel so that tension for lifting applied through the hoisting cable exerts a force through the bull wheel for swinging the boom about the vertical axis in said one direction, the radius of the bull wheel through which said force is applied being practically uniform throughout the range of movement of the boom about the vertical axis.

8. In loading apparatus the combination of a bull wheel supported for rotation about a vertical axis, an upwardly projecting boom supported at the lower end on the bull wheel and mounted for swinging movement about a horizontal axis at said lower end, means anchored at one end for supporting the upper end of said boom for swinging movement about said vertical axis from and to a normal position, and said one end of the anchored means being eccentric to said vertical axis so that movement of the boom in one direction from the normal position about the vertical axis raises the upper end of the boom and thereby provides increasing resistance to movement in said one direction as such movement progresses.

9. In loading apparatus the combination of a boom having its lower end mounted for swinging movement about adjacent vertical and horizontal axes, a stationary mast extending upwardly adjacent the boom, an anchor plate secured to the mast, connector means adapted to be secured to the anchor plate in any one of a series of positions varying in eccentricity from said vertical axis, and means connecting the boom to the connector means to support the projecting end of the boom, the eccentricity of the connector means being such that the boom is raised during its swinging movement in one direction about the vertical axis to increasingly resist movement in said one direction as the movement progresses.

10. In loading apparatus the combination of a boom having its lower end mounted for swinging movement about adjacent vertical and horizontal axes, latch means at the lower end of the boom for releasably holding the boom in a normal position about the vertical axis, a latch release arm movably supported at the upper end of the boom, link means including a member rotatably supported on an axis in substantial alignment with said horizontal axis providing an actuating connection between the latch release arm and latch means which is relatively unaffected in operation by the position of the boom about the horizontal axis, a pulley carried by the upper end of the boom, a hoisting cable extending through said pulley, and means carried by the hoisting cable for actuating the latch release arm.

11. In loading apparatus the combination of a boom having its lower end mounted for swinging movement about adjacent vertical and horizontal axes, latch means at the lower end of the boom for releasably holding the boom in a normal position about the vertical axis, a latch release arm movably supported at the upper end of the boom and link means including a member rotatably supported on an axis in substantial alignment with said horizontal axis providing an actuating connection between the latch release arm and latch means which is relatively unaffected in operation by the position of the boom about the horizontal axis.

12. In loading apparatus the combination of a supporting base, a boom having its lower end mounted for swinging movement relative to the base about adjacent vertical and horizontal axes, a latch plate carried by the base, latch means at the lower end of the boom and adapted to engage the latch plate releasably to hold the boom in a normal position, means for changing the position of engagement of the latch means with the latch plate to change the normal position of the boom, a pulley carried by the upper end of the boom, a latch release arm movably carried at the upper end of the boom and having a slotted portion below said pulley, a hoisting cable extending through the slotted portion of the latch release arm and said pulley, means carried by the hoisting cable below the latch release arm for actuating the latch release arm, said pulley serving as a stop to limit movement of the latch release arm, and means operatively connecting the latch release arm to said latch means.

13. In loading apparatus the combination of a supporting base, a boom having its lower end mounted for swinging movement relative to the base about adjacent vertical and horizontal axes, latch means at the lower end of the boom and adapted releasably to hold the boom in a normal position, a pulley carried by the upper end of the boom, a latch release arm movably carried at the upper end of the boom and having a slotted portion below said pulley, a hoisting cable extending through the slotted portion of the latch release arm and said pulley, means carried by the hoisting cable below the latch release arm for actuating the latch release arm, said pulley serving as a stop to limit movement of the latch release arm, and means operatively connecting the latch release arm to said latch means.

14. In loading apparatus the combination of a supporting base, a bull wheel supported on the base for rotation about a vertical axis, a boom extending angularly upwardly and having its lower end mounted on the bull wheel for rotation about a horizontal axis, a mast secured to the base and extending upwardly adjacent the boom, flexible means connecting the boom to the mast to support the upper end of the boom, pulleys carried by the base and the upper end of the boom, a hoisting cable carried by said pulleys and co-acting with the bull wheel, said hoisting cable having a load carrying end extending downwardly from the pulley at the upper end of the boom and another end to which lifting force is applied, releasable latch means for holding the boom in a preselected position relative to said vertical axis, said co-action between the hoisting cable and bull wheel being such that tension applied through the hoisting cable exerts torque through the bull wheel tending to swing the boom in one direction about the vertical axis from said preselected position, latch release means movably carried by the boom and connected to the releasable latch means, and means carried by the hoisting cable for engaging the latch release means at a predetermined position of the hoisting cable to actuate the latch release means and thereby to effect release of the latch means so that the boom is swung by said torque.

15. In loading apparatus the combination of a supporting base, a stationary mast secured to the base and comprising a tripod structure having a substantially vertical leg, a boom extending angularly upwardly adjacent the mast, means supporting the lower end of the boom for swinging movement about the axis of said vertical leg, means swingably anchoring the upper portion of the boom to the mast, a torsion spring surrounding a portion of the vertical leg and having an end secured thereto, said spring biasing the boom about said axis toward a normal operating position, a pulley carried by the boom, and a hoisting cable extending over the pulley, the ends of the hoisting cable being fixedly anchored to hold the boom in an inoperative position against the biasing force of the spring.

16. In loading apparatus adapted to be mounted on a truck body, the combination of a base adapted to extend laterally across the truck body and to be secured thereto, a boom mounted at one end of the base and extending upwardly and outwardly to a position beyond the side of the body, a pulley at the upper end of the boom, pulleys mounted on the base in spaced relation laterally of the truck body, a winding drum mounted on a rear wheel of the truck on the side of the truck being aligned with the drum, and a hoisting cable carried by said pulleys and having one end secured to the winding drum, the other end of the cable serving to suspend a load carrying device from the boom, the lifting tension in said cable exerting downward forces on opposite sides of the body tending to balance the body stresses.

17. In loading apparatus including a hoisting cable and adapted to be mounted on a truck having wheels, the combination of an extension flange secured concentrically upon the outer surface of one of the truck wheels and extending outwardly therefrom, a winding drum rotatably supported on the outer end of said extension flange and concentric therewith, ratchet means including a ratchet ring secured to said extension flange and a coacting pawl mounted on said winding drum for movement into and out of engagement with the ratchet ring, means biasing the pawl into engagement with the ratchet ring for connecting the winding drum to the extension flange to drive the winding drum in one direction, a manually operable handle, means connecting said handle to said pawl so that the pawl is held away from the ratchet ring when the handle is in one position and is free to coact with the pawl when the handle is in another position, and means holding the handle in each of said positions.

18. In a loading apparatus the combination of a bull wheel supported for rotation about a vertical axis, an upwardly projecting boom supported at the lower end on the bull wheel and mounted for swinging movement about a horizontal axis at said lower end, a stationary mast extending upwardly adjacent the boom, an anchor plate secured to the mast, connector means adapted to be secured to the anchor plate in any one of a series of positions varying in eccentricity from said vertical axis, means connecting the boom to the connector means to support the projecting end of the boom, the eccentricity of the connector means being such that the boom is raised during its swinging movement in one direction about the vertical axis to increasingly resist movement in said one direction as the movement progresses, a pulley at the upper end of said boom, and a hoisting cable extending through the last mentioned pulley and coacting with the bull wheel so that tension for lifting applied through the hoisting cable exerts a force through the bull wheel for swinging the boom about a vertical axis in said one direction, the radius of the bull wheel through which said force is applied being practically uniform throughout the range of movement of the boom about the vertical axis.

19. In a loading apparatus the combination of a bull wheel supported for rotation about a vertical axis, an upwardly projecting boom supported at the lower end on the bull wheel and mounted for swinging movement about a horizontal axis at said lower end, a stationary mast extending upwardly adjacent the boom, an anchor plate secured to the mast, connector means adapted to be secured to the anchor plate in any one of a series of positions varying in eccentricity from said vertical axis, means connecting the boom to the connector means to support the projecting end of the boom, the eccentricity of the connector means being such that the boom is raised during its swinging movement in one direction about the vertical axis to increasingly resist movement in said one direction as the movement progresses, a pulley at the upper end of said boom, a hoisting cable extending through the last mentioned pulley and coacting with the bull wheel so that tension for lifting applied through the hoisting cable exerts a force through the bull wheel for swinging the boom about a vertical axis in said one direction, the radius of the bull wheel through which said force is applied being practically uniform throughout the range of movement of the boom about the vertical axis, a latch means at the lower end of the boom for releasably holding the boom in a normal position about the vertical axis, and a latch release arm movably supported at the upper end of the boom and link means including a member rotatably supported on an axis in substantial alignment with said horizontal axis providing an actuating connection between the latch release arm and latch means which is relatively unaffected in operation by the position of the boom about the horizontal axis.

ROBERT C. SHOEMAKER.